United States Patent [19]

Conn

[11] 3,733,588

[45] May 15, 1973

[54] DIGITAL COMPUTER HAVING A PLURALITY OF SERIAL STORAGE DEVICES FOR CENTRAL MEMORY

[75] Inventor: Richard W. Conn, Livermore, Calif.

[73] Assignee: Michael C. Zimmerman, Palo Alta, Calif. ; a part interest

[22] Filed: May 17, 1971

[21] Appl. No.: 144,299

[52] U.S. Cl. .................... 340/172.5

[51] Int. Cl. .................... G06f 15/02, G06f 13/02

[58] Field of Search .................... 340/172.5

[56] References Cited

UNITED STATES PATENTS

| | | | |
|---|---|---|---|
| 3,360,781 | 12/1967 | Boehnke | 340/172.5 |
| 3,341,819 | 9/1967 | Emerson | 340/172.5 |
| 3,533,076 | 10/1970 | Perkins et al. | 340/172.5 |
| 3,161,855 | 12/1964 | Propster, Jr. et al. | 340/172.5 |
| 2,686,632 | 8/1954 | Wilkinson | 235/176 |
| 2,845,609 | 7/1958 | Newman et al. | 340/172.5 |
| 3,307,156 | 2/1967 | Durr | 340/172.5 |

OTHER PUBLICATIONS

"Burroughs Series L2000 Electronic Billing Computer," Brochure by Burroughs Corp., Jan. 1969.

*Primary Examiner*—Gareth D. Shaw
*Attorney*—C. Michael Zimmerman

[57] ABSTRACT

A small digital computer is described having a unique memory configuration which makes the computer quite suitable for highly interactive uses and yet places it in a price range similar to that of an electric desk calculator. The computer includes an input keyboard arrangement enabling an operator to directly deliver data to the computer, as well as a processor for manipulating data. The central memory is made up of four magnetostrictive delay lines, and secondary storage is provided in the form of a tape cassette. The control unit for directing operation of the computer is adapted to transfer data between one of the delay lines of central memory and the secondary storage at the same time data is being directed between another one of the storage devices and the processor for manipulation.

16 Claims, 4 Drawing Figures

Patented May 15, 1973 3,733,588

4 Sheets-Sheet 1

INVENTOR.
Richard W. Conn
BY
C. Michael Zimmerman
ATTORNEY

Patented May 15, 1973 3,733,588

4 Sheets-Sheet 2

INVENTOR.
Richard W. Conn
BY
[signature]
ATTORNEY

INVENTOR.
BY Richard W. Conn

C. Michael Zimmerman
ATTORNEY

INVENTOR.
Richard W. Conn
BY
[signature]
ATTORNEY

DIGITAL COMPUTER HAVING A PLURALITY OF SERIAL STORAGE DEVICES FOR CENTRAL MEMORY

BACKGROUND OF THE INVENTION

The present invention relates to digital computers and, more particularly, to a small digital computer having a memory which is sufficiently inexpensive to make the cost of the computer comparable to that of a simple electric desk calculator, and yet provides the computer with a response time suiting it for uses requiring a high degree of interaction between the operator and the computer.

Although computers first gained wide usage as tools for solving scientific and mathematical problems requiring complex and long computation, they are now extensively used for many other purposes. Many of these uses require a relatively high degree of interaction between the operator of the computer and the computer itself. That is, they require generally continual communication between the operator and the computer. An example of such a use is one in which an engineer first requires a computer to solve an equation, and then uses the solution to the equation in instructing the computer to carry out further arithmetic operations.

Because of the high initial cost of a computer system, as well as its maintenance and operating costs, many have found it impractical to own a computer although they could advantageously employ one for interactive type uses. Even the so-called "mini-computers" are too costly and complex to warrant their purchase and use by many who have a need for interactive computer usage. For this reason, time sharing systems have been developed in which one computer, and hence its initial cost and operating expenses, is shared by a large number of users. However, while time sharing has made computer usage available to those who otherwise would be economically blocked from such usage, time sharing has several serious disadvantages. For example, time sharing makes it fairly easy for the unscrupulous to have access to the proprietary computer programs and information of those who utilize the shared computer. That is, the computer programs and information of each individual user are stored within the memory of the shared computer, along with the programs and information of others. While numerous techniques have been devised to prevent unauthorized access by anyone to the information and programs within a shared computer which are not their own, none of such techniques have proven satisfactory. And although time-sharing allows less expensive use of a computer than that incurred in buying one outright, it is still relatively expensive. This is because while the cost of the computer is being shared, each individual user must also pay for communicating with the computer via telephone lines, etc. The cost of communication has been known to approach and sometimes exceed the cost of the actual computer usage. Thus, the savings in operating costs attributable to time sharing of the computer can be offset by the costs of communication.

SUMMARY OF THE INVENTION

The present invention is a small digital computer having a unique central memory configuration which enables the computer to be quite inexpensive and yet makes the same suitable for uses requiring a high degree of interaction between an operator and the computer. To this end, the central memory of the computer is made up of at least two, and preferably more, separate serial storage devices, each one of which is in communication with both the processor of the computer and a secondary data source such as a secondary serial memory. As a salient feature of the instant invention, the control unit of the computer is adapted to transfer data between the secondary data source and any one of the serial storage devices, at the same time it is directing delivery of data from another one of the serial storage devices to the processor for manipulation.

It has been found that the simultaneous implementation of separate serial storage devices for central memory provides a computer with a sufficiently high response time to make it ideally suited for most, if not all, interactive uses. In this connection, it should be noted that in order to be acceptable, the response time of the computer, i.e., the time it takes the computer to provide a user with a reply in interactive work, need not be greater than the user's own reaction time. The response time obtained in using one of two or more inexpensive serial storage devices provided as central memory to transfer data to central memory from secondary storage while at the same time using another one of the serial devices to deliver data to the processor, enables the computer to have a response time sufficiently low to prevent frustration of the user. The necessity of more common but yet highly expensive random access storage devices, such as magnetic core or thin film memory, is thus eliminated.

It has been found that the response time provided by the combination of the invention is also sufficient to enable the performance of compute-bound operations. For example, the response time for compute-bound requests, such as compilations and iterative numeric calculations, is comparable to that which one would expect from a highly-used, small time-sharing system.

Most desirably, the central memory of the computer of the invention includes one other data storage device, preferably also an inexpensive serial device, which is in communication with the processor of the computer. This additional data storage device provides a pre-set interrupt location to which the instruction sequence is diverted if the particular one of the storage devices of the central memory called for by the control logic is "busy" at the time, such as if the storage device is in the process of having data from the secondary source either transferred into it or removed from it. The address of the interrupted instruction is thus saved for later performance of the instruction, and an alternate instruction sequence starting at the interrupt location can be executed in the meantime. The additional data storage device is desirably of the recirculating type and can also act as means for refreshing output data for delivery to a visual output device, such as delivery to a cathode ray tube.

Most desirably, more than two of such serial data storage devices are provided for the central memory, all of which are of the recirculating type and data is recirculated through all of them at the same speed. A single memory word counter and comparator is preferably in simultaneous communication with all of the serial data storage devices for synchronizing the feeding and removal of data therefrom, and a memory address register is provided for registering which one of the storage devices is being addressed at any time, as well as for registering a general address of the requested data. The general address is applicable to all of the storage devices, and the counter and comparator cooperates with the address register in gating the requested data from the specified one of the storage devices at the appropriate time in the recirculation cycle of the storage devices. This use of a single memory word counter and comparator for gating all of the storage devices further simplifies the arrangement for an added cost saving.

The computer of the invention includes many other features and advantages which will be described and will become apparent from the following more detailed description.

BRIEF DESCRIPTION OF THE DRAWINGS

With reference to the accompanying four sheets of drawing.

DETAILED DESCRIPTION OF THE PREFERRED EMBODIMENTS

Figure 1:
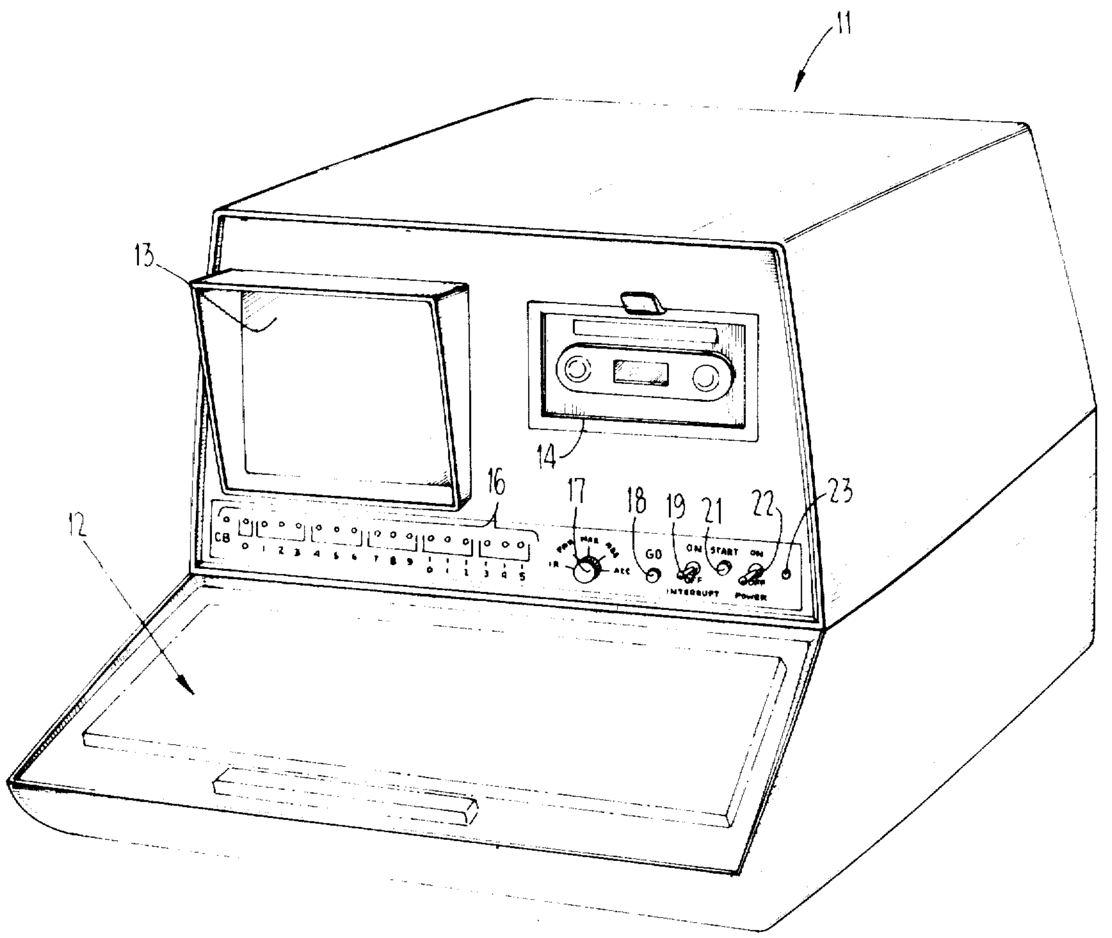
FIG. 1 is a perspective view of a preferred embodiment of the instant invention.

With reference to FIG. 1, a preferred embodiment of the invention, generally referred to by the reference numeral 11, is shown in the form of a desk top unit. Insofar as the visible aspects of the unit are concerned, it includes an alphanumeric keyboard 12 which provides means by which an operator can directly communicate with the computer. The keyboard is preferably of the self-encoding type in which the keys themselves perform the encoding by appropriately contacting electrical conductors. The computer 11 also includes a visual display output device in the form of a cathode ray tube 13. As will be described in more detail hereinafter, cathode ray tube 13 communicates with the central memory of the computer for providing readily ascertainable output for the computer operator. It will be realized, of course, that other computer output devices, such as hard copy producers, e.g., line printers, could also be used with the instant invention.

Unit 11 also includes means for communicating the same with a secondary data source for supplying data, i.e., instructions and information, to the central memory. More particularly, a tape cassette recorder and play-back unit 14 is mounted on the unit adjacent cathode ray tube 13. Because of the unique central memory configuration of the present invention, the recorder and play-back unit 14 need not be an expensive one. It has been found that one providing a recording and play-back speed of 3.75 inches per second, with a recording density of 800 bits per inch, and a fast forward and rewind speed of 75 inches per second is sufficient for the purposes of the instant invention. Low cost units normally sold only for audio purposes meet these criteria, and are applicable to the instant invention.

It should be noted that although the primary function of the cassette recorder and play-back unit 14 is to provide secondary data storage, it can also act as an inexpensive and convenient input/output source for the computer. That is, it can provide program instructions to the central memory and can provide a relatively permanent output copy. Initial input is, of course, entered into central memory by way of the alphanumeric keyboard 12.

The unit 11 also includes an operation panel 15 having an array 16 of display lamps for indicating the binary pattern at any time of various registers of the computer. A rotary switch 17 is also included on the operation panel for communicating the display lamp array 16 with various ones of the registers. In this particular embodiment, the switch 17 is arranged to selectively communicate the lamp array with an input register, program address register, memory address register, memory buffer register, and accumulator of the computer, all of which registers will be described in more detail hereinafter. The preferred embodiment is designed to accommodate 16 bit words representing data as either a single fixed point binary fraction in two's complement form, or as two 8 bit character bytes, the last 6 bits of each conforming to USASCII Standards. For this reason, 17 lamps are included in the array to accommodate all of the above registers, including the accumulator which includes a "carry bit."

To the right of rotary switch 17 is a "GO" button 18 with which an operator can cause, dependent upon the setting of interrupt toggle switch as described below, execution by the computer of the next instruction from the location specified at the time by the program address register, sometimes referred to as the program counter. Next to button 18 is an "INTERRUPT" toggle switch 19 which will set or reset an interrupt step mode flip-flop. When set by the toggle, the flip-flop will force a machine halt after each instruction read and after each instruction execute. If the "GO" button is depressed while the flip-flop is set following the reading of an instruction, the machine will proceed to execution thereof. However, if the "GO" button 18 is depressed after execution of an instruction and without a resetting of the flip-flop, the address within the program counter will be stored and the next instruction for the apparatus will be taken from an interrupt location which will be described hereinafter.

A "START" button 21 to the right of the toggle switch 19 enables the initial start up of the computer. More particularly, depression of button 21 clears all registers and forces an initial transfer of information from secondary storage into a predetermined location in central memory. Once the information as been so transferred, instruction execution will begin from a start location. Next to the button 21 is a main power toggle 22 and a lamp 23 for indicating whether or not the keyboard 12 can be used.

The desk top unit illustrated in FIG. 1 provides not only all that is necessary for an operator to use the computer, but also packages the various registers, control logic, and central memory devices necessary for the computer. The resulting package is as compact and easily operated as a conventional display terminal for larger computer or time sharing systems.

Figure 2A:
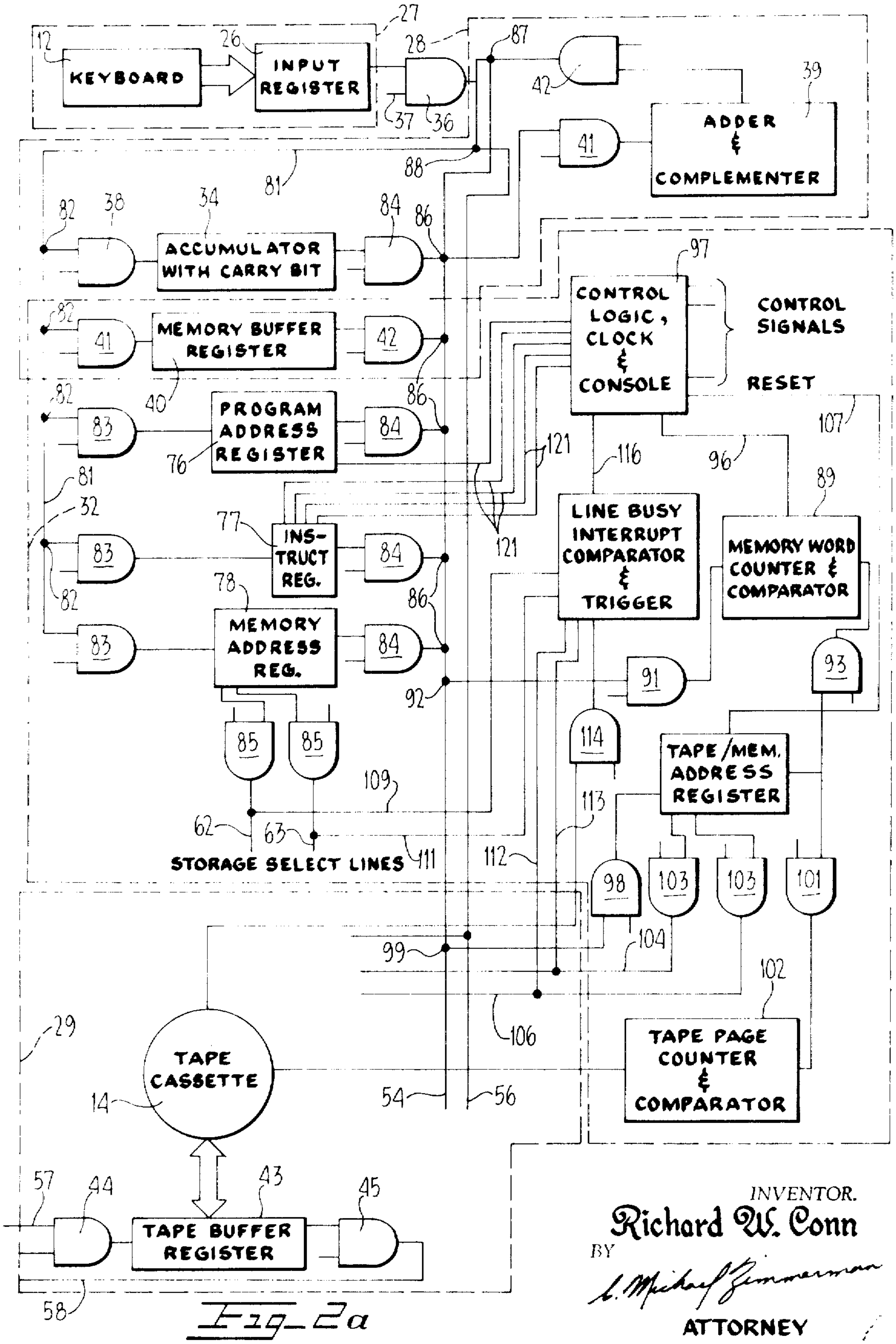
FIGS. 2*a* and 2*b* illustrate a logic diagram of the preferred embodiment.
Figure 2B:
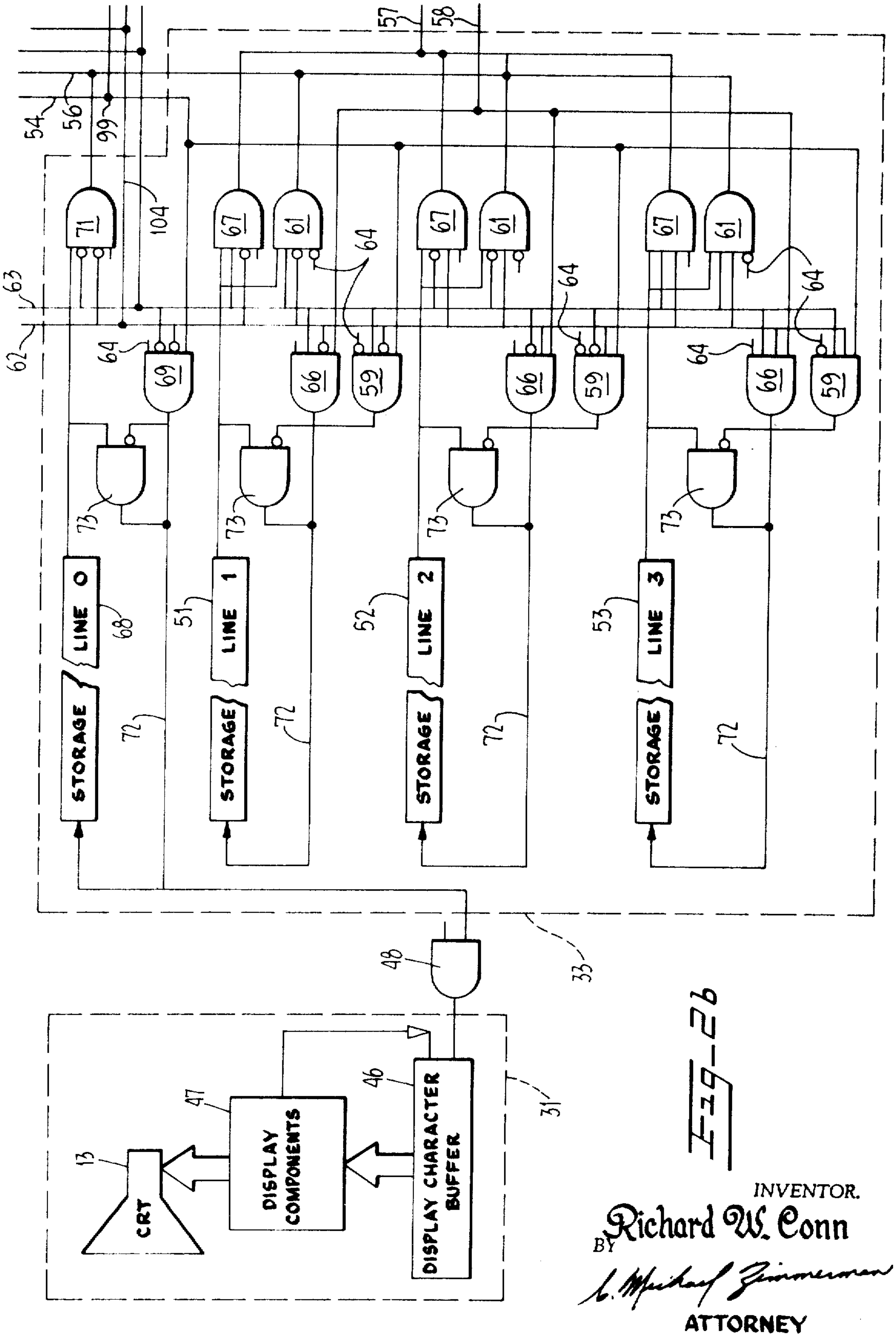

FIGS. 2*a* and 2*b* show a logic diagram of the major components of the computer of the invention and their relationship to one another. Such components are grouped together in a conventional manner as the broad functional elements of a computer. That is, the keyboard 12, represented by a block in FIG. 2*a*, is grouped with an input buffer register 26 within a dotted line enclosure 27 delineating the input device for the computer. Similarly, the components of the computer making up the processing or arithmetic unit are grouped together within the dotted line enclosure 28, the components providing secondary storage and input of the same into the central memory are grouped together within enclosure 29, and the components providing display output for the computer are grouped together within enclosure 31 (FIG. 2b). The computer also includes the components necessary for controlling the operation of the computer, which components are grouped together as the control means within enclosure 32, and, of course, the components providing central memory which are grouped within enclosure 33.

As mentioned previously, the input device 27 by which an operator can directly communicate with the computer includes not only the keyboard 12, but an input buffer register 26. In the preferred embodiment, the input register is an eight bit register and depressing a key of the keyboard will enter an encoded character into the buffer, as well as set a one bit flag register. The flag register is interrogated by a running program and is reset by transferring the contents of the keyboard buffer to the accumulator 34. Striking a subsequent key on the keyboard will not enter a new character into the buffer while the flag is set. Thus, only one "letter" can be brought into the system at one time, and the lamp 23 on the operation panel will indicate when additional letters can be entered by way of the keyboard. It will be appreciated, that an appropriate program can be written as is conventional which will enable the receipt of input data sequentially into the computer while the operator is depressing keys on the keyboard at a typing rate. The actual entry of the contents of the input register into the computer is by way of an "and" gate 36 which includes a control signal line 37 connected to the control logic of the computer for triggering the gate at appropriate times. For the sake of simplicity, this connection of the signal line to the control logic is not actually shown on the drawing for either this gate or any of the other gates which are included. Such connection is merely represented by a signal line extending from the respective gates.

The accumulator 34 into which data from the keyboard is entered is part of the processing or arithmetic unit 28 of the computer, and data is entered into such accumulator via gate 38. The accumulator is a seventeen bit shift register in which the high order bit is a "carry bit" for handling addition carry.

The arithmetic unit 28 includes, in addition to accumulator 34, an adder and complementer 39 and a memory buffer register 40 which is a sixteen bit register. Both the adder 39 and the memory buffer register have appropriate logic gates 41 and 42 for respectively entering or removing data therefrom.

If a decoded instruction indicates that an arithmetic operation is to be performed on data, then the data is read from central memory into the memory buffer register 40 which is used by the adder and complementer 39, in combination with the accumulator, to perform the arithmetic. Arithmetic operands may be thought of as binary fractions with the binary point between bits zero and one (numbering from the left). Negative numbers are handled in two's complement representation, so that the value of a word is greater than minus one and less than plus one, and the high order bit, bit zero, represents its sign.

The tape cassette recorder and playback unit 14 is represented in FIG. 2a as a circle. It and an input/output tape buffer register 43 having appropriate input and output gates 44 and 45, respectively, make up the secondary storage for the computer. As has been mentioned previously, the recorder and playback unit 14 can be of the inexpensive audio type and can act as an input/output source for the computer, as well as a secondary storage device. This enables a library of cassettes, each having a different program for a special purpose application to be generated. For example, separate cassettes having the BASIC language program for school instruction, a "Desk Calculator" program for small businesses, and a "Preparing your Federal Tax Returns" program for individuals, can be provided.

The tape buffer register 43 is connected in a manner to be described with the central memory of the computer for transferring data between a tape cassette and the central memory. In some embodiments of the invention, though, it may be desirable to provide data to the central memory from some other type of data source which may or may not be an integral part of the computer. Thus, various means for delivering data to the central memory from a secondary data source can be provided, depending upon the actual secondary data source with which the invention is used.

With reference to FIG. 2b, it will be seen that the output device 31 of the computer includes not only the display tube 13 but also a display character buffer 46 and those conventional display components, represented by block 47, needed to convert the buffer output to electrical signals for appropriately modulating the display tube to provide the desired visual output. The display character buffer 46 is a 32 bit output buffer which receives the output data via an "and" gate 48 from a particular location within the central memory which will be described hereinafter.

In keeping with the invention, the central memory 33 of the computer, also illustrated in FIG. 2b, includes a plurality, in this case, three, separate serial storage devices as represented by the "storage line" blocks 51, 52 and 53. Each of these storage devices or lines is in communication both with the processor and various registers of the computer via lines 54 and 56, and with the secondary storage device via lines 57 and 58. Input and output "and" gates 59 and 61 are respectively associated with each of the storage lines for appropriately gating data into and out of the storage lines. Such gates are all in communication with the control means of the computer via a pair of storage line select lines 62 and 63 which direct gating signals thereto. In this connection, each of the gates is also connected via a control signal line 64 to the control logic and the individual gates are provided with discriminating "nots" enabling each to be addressed separately. Input and output gates 66 and 67, respectively, are similarly provided for individually communicating each of the storage lines with the lines 57 and 58 leading to secondary storage. The gates 66 and 67 are also connected with the select lines 62 and 63 and the control logic with appropriate nots enabling individual selection of the same.

The central memory of the invention includes one additional data storage device represented by storage line block 68. Storage line 68 is in communication via input and output gates 69 and 71, respectively, with the lines 54 and 56 leading to the processor and the registers. However, such storage line is not in direct communication with secondary storage for reasons which will become clear hereinafter. The gates 69 and 71 are also connected with the gate select lines 62 and 63 and the control logic to enable appropriate gating of the storage line 68.

Most desirably, all four of the storage lines 51–53 and 68 are of the recirculating data type, such as magnetostrictive delay lines or shift registers. In this connection, each of the lines is provided with a feed-back loop 72 and an "and" gate 73 representative of such recirculation of data.

It will be readily appreciated by those skilled in the art that serial storage devices such as magnetostrictive delay lines and shift registers, provide data storage much less expensively than do more conventional random access core or thin film memories. It has been found that although serial storage devices do not enable random access, they can be made to provide the computer with a sufficiently fast response time to prevent frustration of an operator using the same for purposes requiring a relatively high degree of interaction between the operator and the computer. In this connection, magnetostrictive delay lines having an average access time to data stored therewithin of approximately a millisecond are quite suitable for the purposes of the instant invention. In the specific embodiment being described, each of the storage lines is such a magnetostrictive delay line capable of storing 4096 bits of data or, in other words, 256 sixteen bit words. Each line has a bit recirculating rate of two megahertz to thereby provide for each a maximum access time of a little over 2 milliseconds or the desired average access time of a approximately 1 millisecond.

As mentioned previously, the control unit 32 of the computer is adapted to direct delivery of data from any one of the serial storage devices while simultaneously transferring data between any other one of the storage lines 51–52 and the tape cassette. With reference to FIG. 2*a*, such control unit includes, as is usual, the memory buffer register 40 which also acts as part of the processor 28, a program address register or counter 76, an instruction register 77, and a memory address register 78. All of these registers are communicated with the processor 28, central memory 33 and through the accumulator with input device 27. More particularly, a common data input bus line 81 communicates through appropriate "or" gates 82 with an input "and" gate respectively associated with each register. The previously mentioned input gates 38 and 41 for the accumulator and memory buffer register provide such "and" gating for such registers, while each of the other registers is provided with an input "and" gate 83 for this purpose. The output of all of such registers is communicated via appropriate "and" gates 84 and "or" gates 86 with the line 54 which communicates with input gates 59 and 69 of the central memory storage lines.

The two highest order bits of the memory address register 78 are also connected via appropriate "and" gates 85 to the storage lines 62 and 63. Line 54 is also connected via an "or" gate 87 with the output gate 36 from the input device and the output gate 42 from the adder. Moreover, line 56, which is connected with the output gates 61 and 71 of the storage lines, also communicates via an "or" gate 88 with the common input bus 81 of the registers.

The control unit of the invention has a memory word counter and comparator 89, whose function will be described in more detail hereinafter. The input of such counter and comparator is connected via an appropriate "and" gate 91 and an "or" gate 92 to line 54. Additional input thereto is also provided, via an "and" gate 93, from a tape/memory address register 94 whose function will also be described in more detail hereinafter. A control signal line 96 extends from the memory word counter and comparator 89 to a block 97 which represents, among other things, the conventional logic for controlling operation of the various gates of the computer. Input to the tape/memory address register 94 can also be had from bus 54 through an appropriate "and" gate 98 and an "or" gate 99. The output of such address register is connected through an "and" gate 101 to a tape page counter and comparator 102 which provides control for the operation of the cassette recorder and playback unit 14. The two highest order bits from the tape/memory address register 94 are communicated via "and" gates 103 and lines 104 and 106, respectively, with the storage select lines 62 and 63 (FIG. 2*b*). A "reset" line 107 extends to the tape/memory address register 94 from the control logic block 97.

The control unit also includes a line busy interrupt comparator and trigger 108 which communicates via lines 109 and 111 with the storage select lines 62 and 63, respectively. Such comparator also communicates via a pair of lines 112 and 113 with the lines 104 and 106 extending between the tape/memory address register gates 103 and the select lines 62 and 63. An "and" gate 114 communicates the state of the tape cassette 14 to the line busy interrupt comparator and trigger 108, and a trigger signal line 116 is provided between such trigger and the control logic 97.

The operational and functional aspects of the computer will now be described to facilitate an understanding of the same. It should first be noted that the memory storage space is, in effect, broken up into blocks or pages of data, each one of which contains the amount of data necessary to fill one of the storage lines, i.e., 256 sixteen bit words. The data contained on any tape cassette for use with the invention is correspondingly grouped into blocks of data of such size. For initial start up, the operator depresses the "start" button 21 on the operational panel. This causes the block of data at a specified location within the tape cassette associated with the recorder and playback unit 14 to be read into storage line 68 of the central memory, and control transferred to a predetermined "start" location within such storage line 68. This data can be an operating system providing instructions enabling the input of information from the keyboard as well as a dictionary of other operating programs. The computer can then be made to load itself with a full complement of operating programs, as is necessary. The keyboard can then be used to call into central memory, i.e., into prescribed ones of the storage lines 51–53 or 68, the blocks of data, including instructions, needed to perform a desired operation.

The program address register will have assumed during the above operation its normal function of indicating the location of the next instruction read out. Such register is a ten bit register with the first two bits being used to select the proper storage line and the other eight bits to select the location within the selected line of the desired word. The contents of the program address register are sent to the memory address register for fetching of the requested data. In this connection, note that the first two bits within the memory address register are directed to the storage select lines and the remaining eight bits are used to gate out the specified data. Such data is read into the memory buffer register 40 where it can be acted with or upon by the arithmetic unit 28.

The first four bits of each instruction determine the operation code and will be fed into the instruction register 77. As is represented by the four control signal lines 121 leading from the instruction register to the control logic, the operation code is fed into the control logic for decoding to appropriately effect the data transfers and manipulations called for by an instruction.

As one salient feature of the instant invention, it is so arranged that only one memory word counter and comparator is required even though central memory includes more than one separate serial storage device. To this end, all four storage lines 51–53 and 68 are provided with the same data recirculating speed, and the memory word counter and comparator 89 monitors the states of data recirculation in all of such storage lines to synchronize the feeding and removal of data therefrom. As mentioned before, the memory address register 78 specifies not only a particular one of the storage lines containing requested data, but also the address within that line of the data. This latter address is a general address, i.e., applicable to any one of the storage lines. Each general address within the memory address register is compared with the memory word counter and comparator which is monitoring the data recirculation within the storage lines. Upon a match occurring, the memory word counter and comparator signals the control logic to provide a gating signal to all of the storage lines for the data at the specified general address. However, the two high order bits directed to the storage select lines 62 and 63 from the memory address register only allow gating of the data from the selected one of the lines. Thus, only the single memory word counter and comparator is needed to gate requested data to all of the lines. This reduces the components necessary for proper operation of the control unit and consequently reduces its cost.

In this specific embodiment of the invention, the transferring of blocks of data between the tape cassette and the storage lines of the central memory is done by program control. That is, appropriate program instructions are included requesting specified blocks of data on the cassette to be read into the storage lines when such data is needed. The actual reading of the information into or out of a storage line can take place simultaneously with the reading and execution of further instructions.

The transfer of a block of data in the tape cassette to one of the storage lines is accomplished by first reading the tape address of the block of data into a secondary memory address register, i.e., the tape memory address register 94 through "and" gate 98. The tape page counter and comparator 102 indicates the positioning at any time of the tape relative to the readout mechanism of the cassette, and winds or rewinds the tape cassette until a comparison between the tape page counter and comparator and the tape/memory address register indicates that the requested block of data on the tape is appropriately positioned for gating. The two high order bits of the tape/memory address register select which one of the storage lines 51–53 of central memory into which the data is to be inserted, and then such address register is reset to zero by the control logic. The address register 94 is then used, in combination with the memory word counter 89, to transfer the block of data, one word at a time into the selected line. The tape/memory address register 94 thus serves a dual function. That is, it not only stores the address of the block of data requested from the tape cassette, but also aids in counting the full block of data into the selected line.

It will be appreciated that the transfer of data from any one of the lines 51–53 into the tape cassette is accomplished by substantially the same process, only reversed. In this connection, a one bit register (not shown) associated with each of the storage lines will indicate whether or not the data already within such storage line is the same as when it was transferred into the storage line from the tape cassette. That is, it will determine whether or not the data in the line has been changed by processing. If it has been so changed, and an instruction requires a new block of data to be inserted into the storage line, the changed block of data will be rewritten back into the tape cassette before insertion therein of the new block of data.

Because data can be in the process of being transferred between the tape cassette and one of the storage lines at the same time data from the central memory is being otherwise manipulated by the computer, there is a probability that an instruction may request the use of one of the storage lines for data manipulation at the same time data supplied by the tape cassette is being transferred into or out of such storage line. The invention includes an arrangement for handling such a situation. More particularly, the line busy interrupt comparator and trigger 108, by virtue of its connection between storage select lines 62 and 63 and lines 104 and 106, provides a comparison indication of whether or not both the memory address register and the tape/-memory address register are addressing the same storage line. If they are, and a signal through "and" gate 114 to the comparator and trigger indicates that the tape cassette is in the process of transferring data into the specified line, the comparator and trigger 108 provides a triggering pulse through line 116 to the control logic. Such triggering pulse forces a predetermined "interrupt" address located in storage line 68 of central memory into the program address register 76. This results in control being transferred to the predetermined interrupt location for saving of the address of the interrupted instruction for later performance and execution of an alternate instruction sequence (subroutine).

The "interrupt" location within storage line 68 can also be used in a program stepping for debugging. For example, a subroutine may be entered at the interrupt location which will convert and store relevant registers for subsequent display on the output device. Manual actuation of the interrupt toggle 19 on the operation panel will cause the contents of the program address register to be stored and the next instruction taken therefrom. As has been discussed previously, depression of the "GO" button 18 on the operation panel will always cause the next instruction to be read from the location specified by the program address register. Thus, the operator can view the contents of the various registers in any format he has chosen by depressing the "GO" button.

The arrangement is also designed to enable debugging in another manner. That is, the display lamps 16 on the operational panel may be used in conjunction with the rotary switch 17 to inspect the contents of the major processor registers. Inspection of the state of the computer in this manner is ideally suited for checking on machine malfunction, for example, or on difficult logical sequences.

Means are preferably provided by discriminating between a manual transfer to the interrupt location caused by the interrupt toggle 19, and an automatic transfer thereto caused by interrupt trigger 108. In this embodiment, this discrimination is simply accomplished by including an instruction in the computer program which interrogates the state of the triggering toggle.

Storage line 68 of the central memory is also used in providing display output from the computer. More particularly, the desired output, whether from the processor, the control unit, or another location within central memory, is fed into a specified sequence of addresses with storage line 68. As is illustrated, the "and" gate 48 for directing data into the display character buffer is connected with the storage line 68. The data from such storage line at the sequence of output addresses can therefore be gated by the control logic at the appropriate times during the recirculation cycle of the storage line into the display character buffer 46. The display character buffer is a 32 bit buffer, and four characters of the output data are fed into the display character buffer at a time.

This particular manner of feeding information to the display character buffer for display by the cathode ray tube 13 is especially advantageous. That is, the data on the screen of a visual display output device, such as the tube 13, must be refreshed periodically in order for it to be retained on the screen for a sufficiently long time to enable reading thereof. The recirculation of the data within the storage line 68 enables the same data to be periodically gated into buffer 46. This sequential feeding of the same data into the display character buffer on each cycle of the storage line provides the desired refreshing in a simple manner. It has been found that the display of four characters at a time enables an appropriate periodic refreshment of the display to prevent flickering.

A suitable format for each program instruction to accomplish the above with the hardware described, is one in which the first four bits (0–3) denote the operation code for the instruction register; the fifth bit designates a possible index register; the sixth bit is an indirect bit; the seventh and eighth bits provide a delay line address; and the last eight bits denote the general address within the delay lines for requested data. An appropriate instruction set for the computer is given in the following table in which "A" designates the accumulator; "CB" the carry bit; "M" the memory; "MBR" the memory buffer register; "P" the program counter; and "Y" a memory address.

TABLE I

INSTRUCTION SET

Memory Reference

| | | |
|---|---|---|
| STO Y | 1xxx | $A \rightarrow M_Y$ |
| ADD Y | 2xxx | $A + M_Y \rightarrow A$ |
| SUB Y | 3xxx | $A - M_Y \rightarrow A$ |
| JMP Y | 4xxx | $Y \rightarrow P$ |
| JAM Y | 5xxx | $Y \rightarrow P$, if $A < O$ |
| JAZ Y | 6xxx | $Y \rightarrow P$, if $A = O$ |
| JSP Y | 7xxx | $P + 1 \rightarrow M_Y$, $Y + 1 \rightarrow P$ |
| LDA Y | 8xxx | $M_Y \rightarrow A$ |
| AND Y | 9xxx | $A \wedge M_Y \rightarrow A$ |
| ISP | Axxx | $M_Y + 1 \rightarrow M_Y$, if $M_Y = O$ then $P + 1 \rightarrow P$ |
| JCB Y | Cxxx | $Y \rightarrow P$, if $CB = 1$ |

Non-memory Reference

| | | |
|---|---|---|
| NOP | 0000 | No operation |
| HLT | 0001 | Halt |
| SNI | 0002 | $P + 1 \rightarrow P$, if Interrupt Flag $\neq 1$ |
| SNK | 0003 | $P + 1 \rightarrow P$, if Keyboard Flag $\neq 24$ 1 |
| CLA | 002– | $O \rightarrow A$ |
| CMA | 003– | $2^c(A) \rightarrow A$ |
| CLC | 004– | $O \rightarrow CB$ |
| CMC | 005– | $2^c(CB) \rightarrow CB$ |
| LAK | 006– | Keyboard Buffer $\rightarrow A_{8-15}$ |
| LAB | 007– | $MBR \rightarrow A$ |
| SHR | 008– | Shift CB and A right 1 |
| SHL | 009– | Shift CB and A left 1 |
| RTR | 00A– | Rotate CB and A right 1 |
| RTL | 00C– | Rotate CB and A left 1 |
| RLR | 001– | Rotate A,8 |
| SCO Y | 04xx | If Cassette not Busy, $P + 1 \rightarrow P$ and Search Cassette O for tape page xx. |
| RCO | $0(10xx)_2$ | If Cassette not Busy, $P + 1 \rightarrow P$ and Read tape O into memory page xx (where xx = 1,2, or 3). |
| WCO | $0(11xx)_2$ | If Cassette not Busy, $P + 1 \rightarrow P$ and Write tape O from memory page xx (where xx = 1,2, or 3). |

Figure 3:
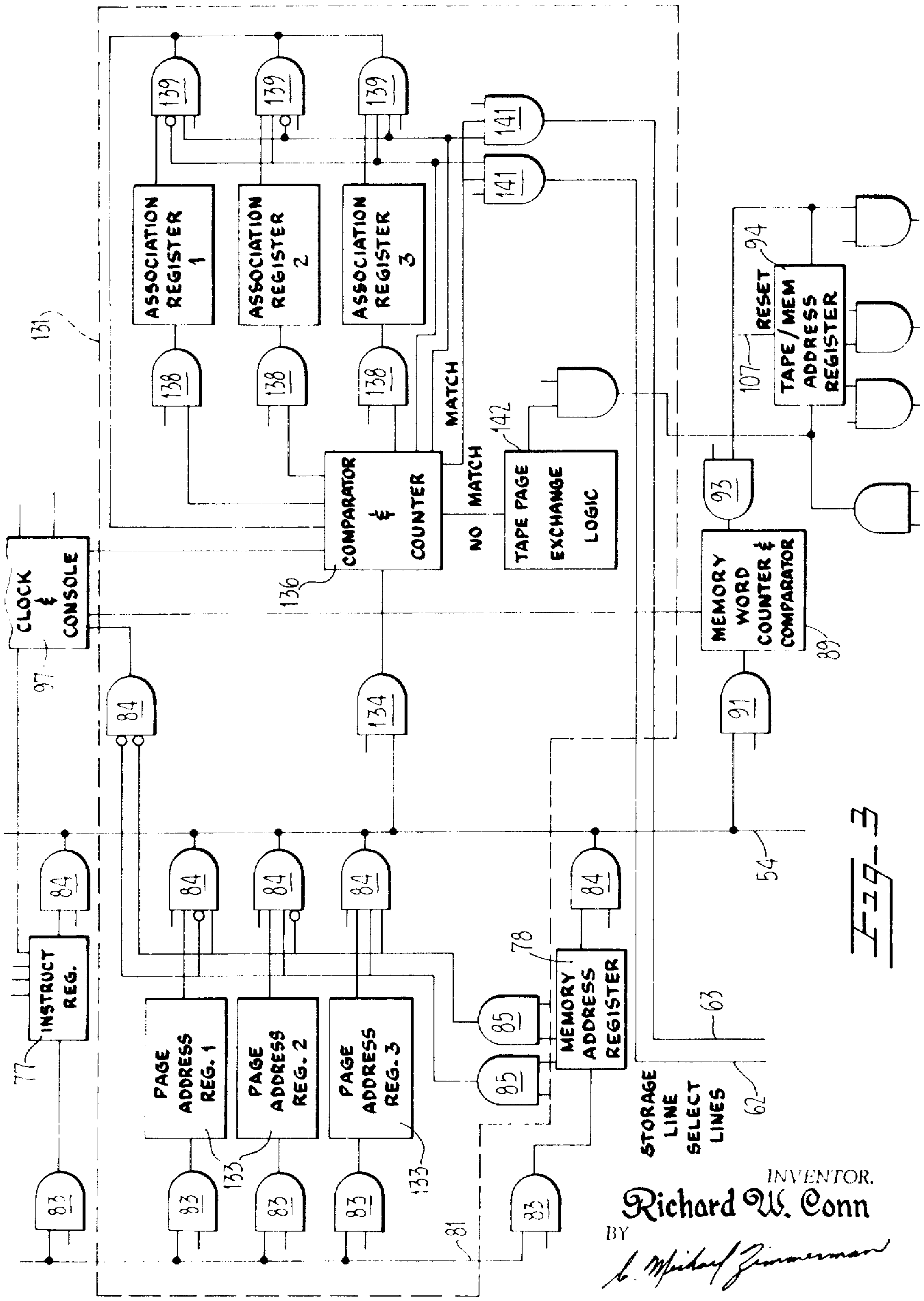
FIG. 3 is a logic diagram of an optional automated addressing and exchange mechanism for controlling the transfer of data between secondary storage and the central memory, illustrating the same incorporated into the preferred embodiment.

As mentioned previously, in the preferred embodiment described above, the transfer of data from secondary storage into the central memory is accomplished by appropriate program instructions. However, the data transfer can also be made to occur automatically whenever an instruction requests data from a block of data which is in secondary storage, rather than in one of the storage lines. FIG. 3 illustrates a preferred automated data transferring arrangement, generally referred to by the reference numeral 131, incorporated into the previously described embodiment. In this connection, FIG. 3 also shows the relevant portions of the previously described embodiment, which portions are referred to by the same reference numerals used for such portions in FIGS. 2*a* and 2*b*.

With reference to FIG. 3, it will be seen that the gates 85 from the two highest order bits of the memory address register do not go directly to the select lines 62 and 63. Rather, such lines provide control signals for activating the output gates of three data block or "page" address registers 133 or, alternatively, the control logic 97. The page address registers 133 are connected between the input bus line 81 and output bus 54 along with the control unit registers previously described. They act, in effect, as an expansion of the memory address register to include all of the blocks of data contained within a secondary storage tape. They will be loaded under program control with addresses for the blocks of data, and an instruction directed toward one of the address registers 133 will indicate an address within the block of data associated with that register's contents. This address of the block will be gated from the register and passed through an "and" gate 134 to a comparator and counter 136. The comparator 136 will compare the address of the block having the requested data with the association registers 137. Each of the association registers corresponds with a respective one of the storage lines 51–53 and indicates the block of data stored therewithin at any specified time.

The input and output of the association registers 137 are appropriately connected via "and" gates 138 and 139, respectively, with the comparator and counter 136 for the comparison with the address of the requested block of data. If a match is found by the comparison, the requested block of data is already within one of the storage lines. Appropriate control signals from the comparator and from the register 137 associated with the line containing the block of data are directed through gates 141 to the storage select lines 62 and 63, to thereby gate the requested information therefrom. However, if there is not a match, the block of data will not be within one of the storage lines. In such a situation, the comparator 136 triggers tape page exchange logic, represented by block 142, to direct operation of the data block transferring mechanism. Thus transfer of a block of data from the tape cassette to central memory is accomplished via the tape/memory address register and memory word counter and comparator previously described. If program execution is delayed awaiting the transfer of a block of data into an appropriate line, the interrupt mechanism will store the contents of the program address register and transfer control to the preset interrupt location as also previously described.

The program word format for any embodiment of the invention, including the above described automated block swapping hardware will be the same as that previously described, except that the seventh and eighth bits will indicate a block of data, rather than a specified storage line. The instruction set will be appropriately modified as well.

While the invention has been described in connection with preferred embodiments thereof, it will be appreciated by those skilled in the art, that many changes and modifications are possible. It is therefore intended that the coverage afforded applicant be limited only by the claims and their equivalents.

I claim:

1. A digital computer comprising a central memory for receiving and storing data to be manipulated; means enabling an operator to directly deliver data to said central memory; means for delivering to and removing from said central memory, data supplied by a secondary data source; a processor in communication with said central memory for receiving data therefrom and manipulating the same; control means for directing operation of said processor and said means for delivering and removing data supplied by a secondary data source from said central memory; and means for delivering data from said central memory or said processor to an output device; said central memory comprising at least two separate serial data storage devices, both of which communicate with said processor and with said means for delivering and removing data supplied by a secondary data source from said central memory; and said control means coupled with both of said serial data storage devices for selecting one of said devices to be in data communication with said processor and for selecting the other of said devices to be at the same time in data communication with said secondary data source, and coupled with said means for delivering and removing data supplied by said secondary source to direct data supplied by said secondary source to be delivered to or removed from said other one of said serial storage devices while data from the first one of said serial storage devices is simultaneously being delivered to said processor for manipulation.

2. The digital computer of claim 1 wherein said central memory includes one other data storage device in communication with said control means; and said control means includes indicating means communicating with said serial storage devices for indicating that data is in the process of being transferred between one of said serial data storage devices and said secondary data source, and interrupting means responsive to a request by said control means for use of a storage device having data being transferred between it and said secondary data source by transferring control to a predetermined location in said one other data storage device.

3. The digital computer of claim 2 wherein manually controllable switching means are connected with said interrupting means for enabling independent selective transfer of control to said predetermined location in said one other data storage device.

4. The digital computer of claim 2 wherein said one other data storage device is of the recirculating serial type and is in communication with said means for delivering data to an output device for feeding data thereto in a recirculating manner.

5. The digital computer of claim 4 wherein a cathode ray tube is included in said combination as a display portion of said output device, said tube being in communication with said means for delivering data to said output device.

6. The digital computer of claim 1 wherein each of said separate serial data storage devices is a recirculating data storage device.

7. The digital computer of claim 6 wherein said means for delivering to and removing from said central memory, data supplied by a secondary data source is adapted to so deliver and remove data from a secondary serial memory device.

8. The digital computer of claim 6 wherein said separate serial data storage devices have generally the same data recirculating speeds; and said control means includes a memory address register communicating with said data storage devices for specifying both the data storage device from which data is requested and a general address for said requested data, which general address is applicable to any one of said storage devices, and a single memory word counter and comparator in communication with said devices for simultaneously monitoring the state of data recirculation in all of said devices and for removing the requested data from the device specified by said memory address register upon the data at said general address in said specified device being positioned in the recirculating cycle of said device for removal therefrom.

9. The digital computer of claim 6 wherein said means for delivering and removing data supplied by a secondary data source from said central memory is adapted to deliver the data from said secondary data source in blocks of data, each one of which includes sufficient data to fill one of said separate serial storage devices of said central memory.

10. The digital computer of claim 9 wherein said control means further includes recording means associated with each of said data storage devices for recording which blocks of data are present in said devices, comparison means cooperable with said recording means for determining whether or not the block of data having data specified by an instruction is present within any one of said serial storage devices, and block exchange means responsive to a determination that the block of data having the specified data is not in one of said serial storage devices by directing said means for delivering and removing data supplied by a secondary data source from said central memory, to deliver said block of data from said secondary data source to one of said serial storage devices.

11. The digital computer of claim 10 further including means for determining whether or not any block of data stored in each of said serial storage devices is different from said block of data when it was transferred from said secondary storage to said central memory, and means responsive to a difference by transferring the different block of data from the serial storage device to said secondary storage device before delivering to the serial storage device the data block containing the specified data.

12. The digital computer of claim 1 wherein said control means includes both a memory address register coupled with said data storage devices for specifying which one of said devices is communicated with said processor and a secondary memory address register coupled with said storage devices for specifying which one of said storage devices is simultaneously communicated with said secondary data source.

13. The digital computer of claim 12 wherein said central memory comprises more than two of said separate serial storage devices which communicate with said processor and with said means for delivering and removing data supplied by a secondary data source from said central memory, said control means coupled with all of said serial storage devices for selecting one of said devices to be in data communication with said process and for selecting any other one of said devices to be at the same time in data communication with said secondary data source and coupled with said means for delivering and removing data supplied by said secondary source to direct data supplied by said secondary data source to be delivered to or removed from said other one of said serial data storage devices while data from the first one of said devices is being simultaneously transferred between said first one of the storage devices and said processor for manipulation.

14. The digital computer of claim 13 wherein said central memory includes one other data storage device in communication with said control means; and said control means includes indicating means communicating with said serial storage devices for indicating that data is in the process of being transferred between one of said serial data storage devices and said secondary data source, and interrupting means responsive to a request by said control means for use of a particular data storage device having data being transferred between it and said secondary data source by transferring control to a predetermined location in said one other data storage device.

15. The digital computer of claim 14 wherein each of said separate serial data storage devices is a recirculating data storage device and the data recirculating speeds thereof are generally the same and said memory address register communicates with said data storage devices for specifying both the data storage device from which data is requested and a general address for said request data, which general address is applicable to any one of said storage devices, and a single memory word counter and comparator for simultaneously monitoring the state of data recirculation in all of said devices and for gating the requested data from the device specified by said memory address register upon said general address in said specified device being positioned in the recirculation cycle of said device for gating therefrom.

16. The digital computer of claim 15 wherein said means for delivering and removing from said central memory data supplied by a secondary data source is adapted to deliver the data from said secondary data source in blocks of data, each one of which includes sufficient data to fill one of said separate serial storage devices of said central memory; and said control means further includes recording means associated with each of said data storage devices for recording which blocks of data are present in said devices, comparison means cooperable with said recording means for determining whether or not the block of data having data specified by an instruction is present within any one of said serial storage devices, and block exchange means responsive to a determination that the block of data having the specified data is not in one of said serial storage devices by directing said means for delivering and removing data supplied by said secondary data source from said central memory, to deliver said block of data from said secondary data source to one of said serial storage devices.

* * * * *